(12) United States Patent
Kamo et al.

(10) Patent No.: US 11,334,508 B2
(45) Date of Patent: *May 17, 2022

(54) STORAGE SYSTEM, DATA MANAGEMENT METHOD, AND DATA MANAGEMENT PROGRAM

(71) Applicant: Hitachi, Ltd., Tokyo (JP)

(72) Inventors: Yuto Kamo, Tokyo (JP); Ryosuke Tatsumi, Tokyo (JP); Tomohiro Yoshihara, Tokyo (JP); Takashi Nagao, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/169,775

(22) Filed: Feb. 8, 2021

(65) Prior Publication Data
US 2021/0165753 A1 Jun. 3, 2021

Related U.S. Application Data

(63) Continuation of application No. 16/546,356, filed on Aug. 21, 2019, now Pat. No. 10,936,518.

(30) Foreign Application Priority Data
Nov. 8, 2018 (JP) ................................. 2018-210691

(51) Int. Cl.
*G06F 13/28* (2006.01)
*G06F 12/0868* (2016.01)

(52) U.S. Cl.
CPC .......... *G06F 13/28* (2013.01); *G06F 12/0868* (2013.01); *G06F 2212/1024* (2013.01)

(58) Field of Classification Search
CPC ................. G06F 13/28; G06F 12/0868; G06F 2212/1024
See application file for complete search history.

(56) References Cited

U.S. PATENT DOCUMENTS 10,936,518 B2 * 3/2021 Kamo ..................... G06F 13/28
2002/0006134 A1 * 1/2002 San Juan ............... G06F 13/364
370/462

(Continued)

FOREIGN PATENT DOCUMENTS

| JP | 2005-044010 A | 2/2005 |
| JP | 2014-167818 A | 9/2014 |

(Continued)

OTHER PUBLICATIONS

Japanese Office Action received in corresponding Japanese Application No. 2018-210691 dated Jan. 5, 2021.

*Primary Examiner* — Henry Tsai
*Assistant Examiner* — John B Roche
(74) *Attorney, Agent, or Firm* — Mattingly & Malur, PC

(57) ABSTRACT

An object of the present invention is to properly secure the consistency of data while suppressing a processing load of a controller on a processor. A storage system includes a plurality of controllers and an HCA that can directly access a memory and can communicate with the controllers. The controller includes a CPU, and a memory having a buffer region into which data is temporarily stored and a cache region into which data is cached. In the case where new data according to a write request is stored into the buffer region, the CPU of the controller sequentially transfers the new data to the cache regions using the HCA without passing through the other buffer regions.

6 Claims, 10 Drawing Sheets

(56) References Cited

U.S. PATENT DOCUMENTS

| | | | |
|---|---|---|---|
| 2005/0021907 A1 | 1/2005 | Shimada | |
| 2010/0174676 A1* | 7/2010 | Ash | G06F 11/1469 |
| | | | 707/609 |
| 2015/0370713 A1* | 12/2015 | Morishita | G06F 3/067 |
| | | | 711/119 |
| 2016/0357552 A1 | 12/2016 | Sakashita et al. | |
| 2017/0329728 A1* | 11/2017 | Karri | G06F 21/79 |

FOREIGN PATENT DOCUMENTS

| | | |
|---|---|---|
| WO | 2015/052798 A1 | 4/2015 |
| WO | 2017/056219 A1 | 4/2017 |

* cited by examiner

| CONTROLLER ID (401) | STATE (402) |
|---|---|
| 0 | NORMAL |
| 1 | BREAKDOWN |
| 2 | NORMAL |

| DATA ADDRESS (501) | FIRST TRANSFER DESTINATION CONTROLLER ID (502) | SECOND TRANSFER DESTINATION CONTROLLER ID (503) | CACHE STATE (504) |
|---|---|---|---|
| 0x1000 | 2 | 1 | DIRTY |
| 0x2000 | 0 | 1 | CLEAN |
| 0x3000 | 2 | 0 | DIRTY |

| DATA ADDRESS (601) | CONTROLLER ID (602) | TRANSFER STATE MANAGEMENT INFORMATION ADDRESS (603) |
|---|---|---|
| 0x1000 | 0 | 0x10000 |
| 0x2000 | 2 | 0x20000 |
| 0x3000 | 1 | 0x30000 |

| DATA ADDRESS (701) | FIRST TRANSFER DATA RECEPTION FLAG (702) | FIRST TRANSFER COMPLETION FLAG (703) | SECOND TRANSFER COMPLETION FLAG (704) |
|---|---|---|---|
| 0x1000 | 1 | 1 | 0 |
| 0x2000 | 1 | 1 | 1 |
| 0x3000 | 1 | 0 | 0 |

STORAGE SYSTEM, DATA MANAGEMENT METHOD, AND DATA MANAGEMENT PROGRAM

CROSS-REFERENCE TO RELATED APPLICATION

The present application claims priority from Japanese application JP 2018-210691, filed on Nov. 8, 2018, the contents of which is hereby incorporated by reference into this application.

BACKGROUND

The present invention relates to a technique for managing data in a storage system.

In a storage system, data is multiplexed (in general, duplicated) among a plurality of storage controllers in order to protect data from a trouble such as power loss. In addition, write data is simultaneously multiplexed in cache regions using a plurality of dedicated circuits in the storage system.

For example, Japanese Unexamined Patent Application Publication No. 2005-44010 discloses a technique of accelerating the speed of writing in a storage system having duplex caches in such a manner that write completion is transmitted to a host when data is stored into a first cache and a FIFO buffer, and then the data is transmitted from the FIFO buffer to a second cache.

On the other hand, in order to reduce development costs of dedicated circuits, WO2015/052798 discloses a technique of guaranteeing the consistency of data in a storage system in which a general-purpose controller emulates a process of a dedicated circuit. In the technique, data received from the outside of a controller is stored into a buffer region, and the controller transfers the data from the buffer region to a cache region, so that the data can be prevented from being destructed even if a trouble occurs during an I/O process.

SUMMARY

In order to improve the performance of a storage system, a storage system in which a plurality of general-purpose controllers are mounted has appeared.

In such a storage system, it is desirable to duplicate data as multiplexing from the viewpoint of suppressing an increasing in memory capacity.

For example, in the case where data is duplicated in such a storage system, controllers that receive data from a host are totally different from those where data is duplicated in some cases. In such a case, in the technique described in WO2015/052798, it is necessary to transfer data from a buffer region to a cache region in each controller where data is duplicated, and there is a risk that a processing load of the controller on a processor is increased to deteriorate the performance of the controller.

The present invention has been made in view of the above-described situations, and an object thereof is to provide a technique capable of properly securing the consistency of data while suppressing a processing load of a controller on a processor.

In order to achieve the above-described object, a storage system according to an aspect includes a plurality of controllers, a storage device unit into which data can be stored, and a DMA (Direct Memory Access) unit that can directly access a memory and can communicate with other controllers. The controller includes a processor unit, and a memory having a buffer region into which data is temporarily stored and a cache region into which data is cached. In the case where new data according to a write request is stored into the buffer region, the processor unit of the controller sequentially transfers the new data from the buffer region storing the new data corresponding to the write request to the cache regions of the plurality of controllers using the DMA unit without passing through the other buffer regions.

According to the present invention, the consistency of data can be properly secured while suppressing a processing load of a controller on a processor.

BRIEF DESCRIPTION OF THE DRAWINGS

FIG. 4 is a diagram for showing an example of a data structure of controller state management information according to the first embodiment;

FIG. 5 is a diagram for showing an example of a data structure of cache state management information according to the first embodiment;

FIG. 6 is a diagram for showing an example of a data structure of transfer management information according to the first embodiment;

FIG. 7 is a diagram for showing an example of a data structure of transfer state management information according to the first embodiment;

DETAILED DESCRIPTION

Figure 1:
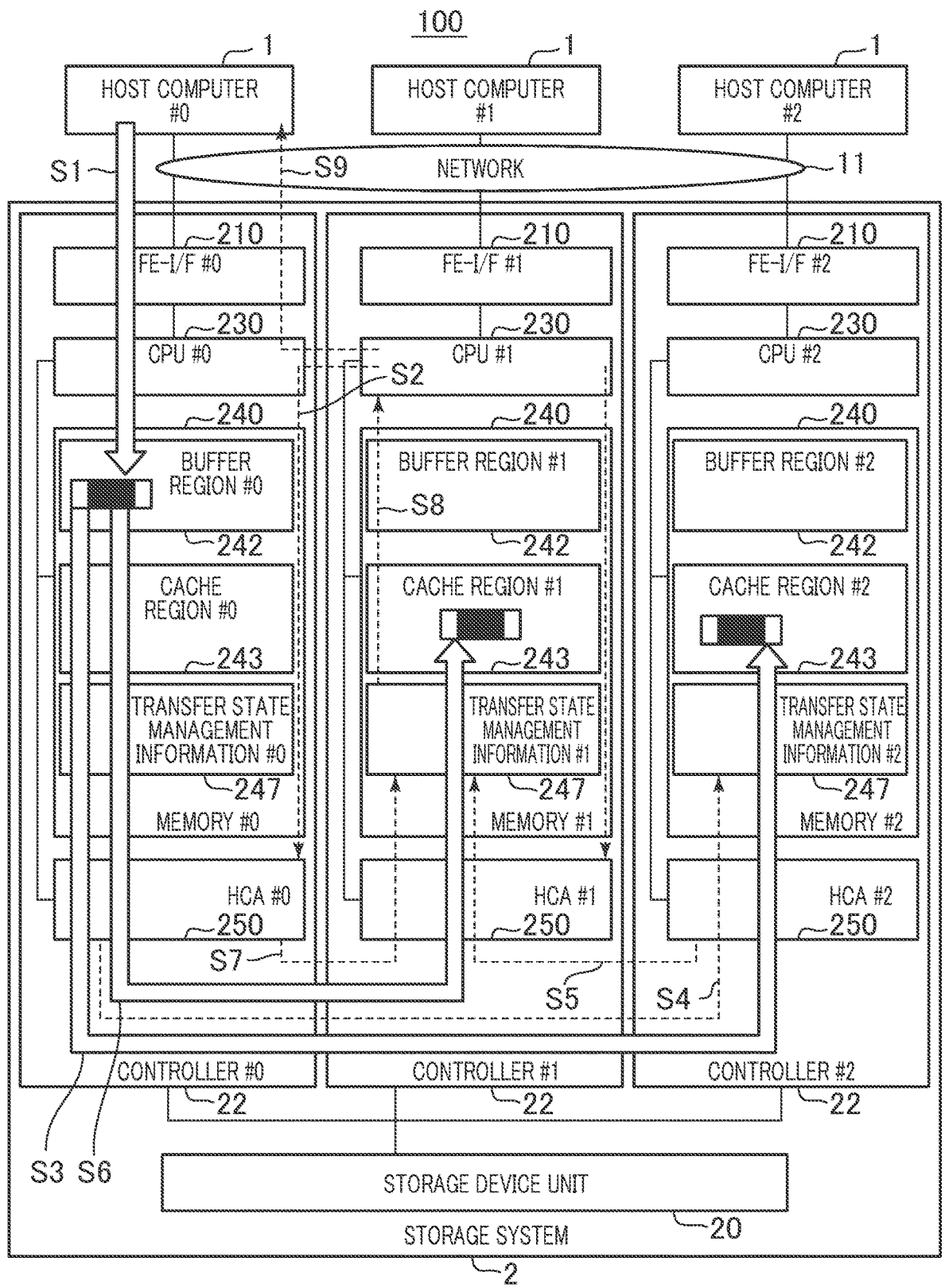
FIG. 1 is a diagram for explaining an outline of a write process of a storage system according to a first embodiment.

Hereinafter, embodiments of the present invention will be described using the drawings. However, the present invention is not interpreted by the limited content described in the embodiments shown below. A person skilled in the art can easily understand that concrete configurations can be changed without departing from the idea and the gist of the present invention.

In the configurations of the invention to be described below, the same or similar configurations or functions will be followed by the same signs, and the duplicated explanations thereof will be omitted.

The notations of "first", "second", "third", and the like in the specification are given to differentiate the constitutional elements, and do not limit numbers or orders.

The position, size, shape, range, and the like of each configuration in the drawings and the like do not show the actual position, size, shape, range, and the like in some cases to easily understand the invention. Thus, the present invention is not limited to the positions, sizes, shapes, ranges, and the like disclosed in the drawings and the like.

Further, meanings of terms in the following description are as follows.

(*) "PDEV" is an abbreviation of a non-volatile physical storage device. A plurality of RAID groups may be configured using a plurality of PDEVs. "RAID" is an abbreviation of Redundant Array of Independent (or Inexpensive) Disks. The RAID group may be referred to as a parity group.

(*) HCA (Host Channel Adaptor) is a device that is instructed by a CPU and performs communications between controllers. HCA is an example of, for example, a DMA (Direct Memory Access) unit, and can directly access a memory.

(*) A processor unit includes one or more processors. At least one processor is typically a microprocessor such as a CPU (Central Processing Unit). Each of one or more processors may be a single core or multicore processor. The processor may include a hardware circuit that performs some or all of processes.

First Embodiment

First, a computer system according to a first embodiment will be described.

FIG. 1 is a diagram for explaining an outline of a write process of a storage system according to the first embodiment. FIG. 1 shows a flow of the write process in which data is sequentially transferred to cache regions 243 (#1 and #2) of controllers 22 (#1 and #2) where data is duplicated.

A storage system 2 of a computer system 100 according to the embodiment includes a plurality of controllers 22 (controllers #0, #1, and #2). The controllers 22 are connected to each other. The controllers 22 are not, for example, controllers dedicated to a storage system but general-purpose controllers. Each controller 22 has an FE-I/F 210, a CPU 230 as an example of a processor unit, and a memory 240. Each memory 240 has a buffer region 242 and a cache region 243, and stores transfer state management information 247.

The storage system 2 defines each controller 22 in charge of processing (the right in charge of processing is referred to as ownership) for each I/O processing space (for example, a logical unit: LU), so that each controller 22 can process I/O requests in parallel from host computers (also referred to as hosts) 1. For example, when the controller #1 has the ownership for LU of LUN #0, an I/O request to LU of LUN #0 is processed under the control of the controller #1.

The host computers 1 (host computers #0, #1, and #2) are connected to the storage system 2 via a communication network 11. Each host computer 1 is connected to, for example, one controller 22.

The controllers 22 do not write write data according to write requests from the host computers 1 into a storage device unit 20, but duplicate and store the data into the cache regions 243 in the controllers 22. Then, the controllers 22 notify the host computers 1 of completion of the write process. Accordingly, a high-speed write process can be realized.

The controllers 22 write the write data in the cache regions 243 into the storage device unit 20 asynchronously with the write requests. When receiving from the host computers 1 new write data to be written into the same regions in a state where the duplex write data has been already stored in the cache regions 243 but has not been written into the storage device unit 20 yet (the state is referred to as a dirty state and the write data is referred to as dirty data), the controllers 22 store the new write data into the buffer regions 242 to avoid destruction of the write data in the cache regions 243. Thereafter, the controllers 22 keep the consistency of the write data by sequentially transferring the new write data stored in the buffer regions 242 to the cache regions 243 in the controllers (the number of which is 2 if the data is duplicated). The transfer state management information 247 is information to manage a progression status (transfer state) when the write data is sequentially transferred to each cache region 243 of the controllers 22 where the data is duplicated.

Here, a transfer in which write data is transferred to the cache region 243 of one controller 22 without passing through the buffer regions 242 of the controllers 22 other than that having received the write request and is transferred to the cache region 243 of a different controller 22 after the transfer is completed is referred to as a "sequential transfer".

Here, a write process in the case where the controller #0 has received a write request to LU with the ownership held by the controller #1 from the host computer #0 will be described.

In the case where the controller #0 has received a write request from the host computer #0, the CPU #0 of the controller #0 transfers the write request to the CPU #1 of the controller #1 having the ownership of LU as a target of the write request.

The CPU #1 secures a region on the buffer region #0 where the write data is stored, and confirms the state of data stored on the cache regions 243 (the cache regions #1 and #2 in the example) corresponding to the write data. In the embodiment, it is assumed that the data in the cache regions 243 is in a dirty state. Since the data in the cache regions 243 is in a dirty state (dirty data), the CPU #1 determines that the sequential transfer is necessary.

Thereafter, the CPU #0 of the controller #0 stores the write data into the region secured on the buffer region #0 via the FE-IF #0 (Step S1).

Next, the CPU #1 requests an HCA #0 to copy (transfer) the write data from the buffer region #0 to the cache region #2 and then to copy (transfer) the write data to the cache region #1 (sequential transfer) (Step S2).

The HCA #0 copies the write data from the buffer region #0 to the cache region #2 via an HCA #2 (hereinafter, referred to as a first transfer) (Step S3). At this time, the HCA #0 confirms a guarantee code given to the data when being copied. The guarantee code may be configured using information (a VOL number, the address of VOL, and the like) indicating the storage position of data and information (CRC (Cyclic Redundancy Check) and the like) confirming the consistency of data.

Next, the HCA #0 stores into transfer state management information #2 transfer reception of the write data to the cache region #2 via the HCA #2, and requests the HCA #2 to store into transfer state management information #1 transfer completion of the write data to the cache region #2 (Step S4). The HCA #2 having received the request stores into the transfer state management information #1 transfer completion of the write data to the cache region #2 via the HCA #1 (Step S5).

Next, the HCA #0 copies the write data from the buffer region #0 to the cache region #1 via the HCA #1 (hereinafter, referred to as a second transfer) (Step S6).

Next, the HCA #0 stores into the transfer state management information #1 transfer completion of the write data to the cache region #1 via the HCA #1 (Step S7).

The CPU #1 confirms completion of duplication of the write data by referring to the transfer state management information #1 (Step S8). Next, the CPU #1 reports write request completion to the host computer #0 via the CPU #0 and the FE-I/F #0 (Step S9). Accordingly, the write data from the host computer 1 is duplicated and stored into the cache region #1 and the cache region #2.

It should be noted that the write data is sequentially transferred to the cache regions #2 and #1 in this order in the above-described example, but the order may be the cache regions #1 and #2.

Figure 2:
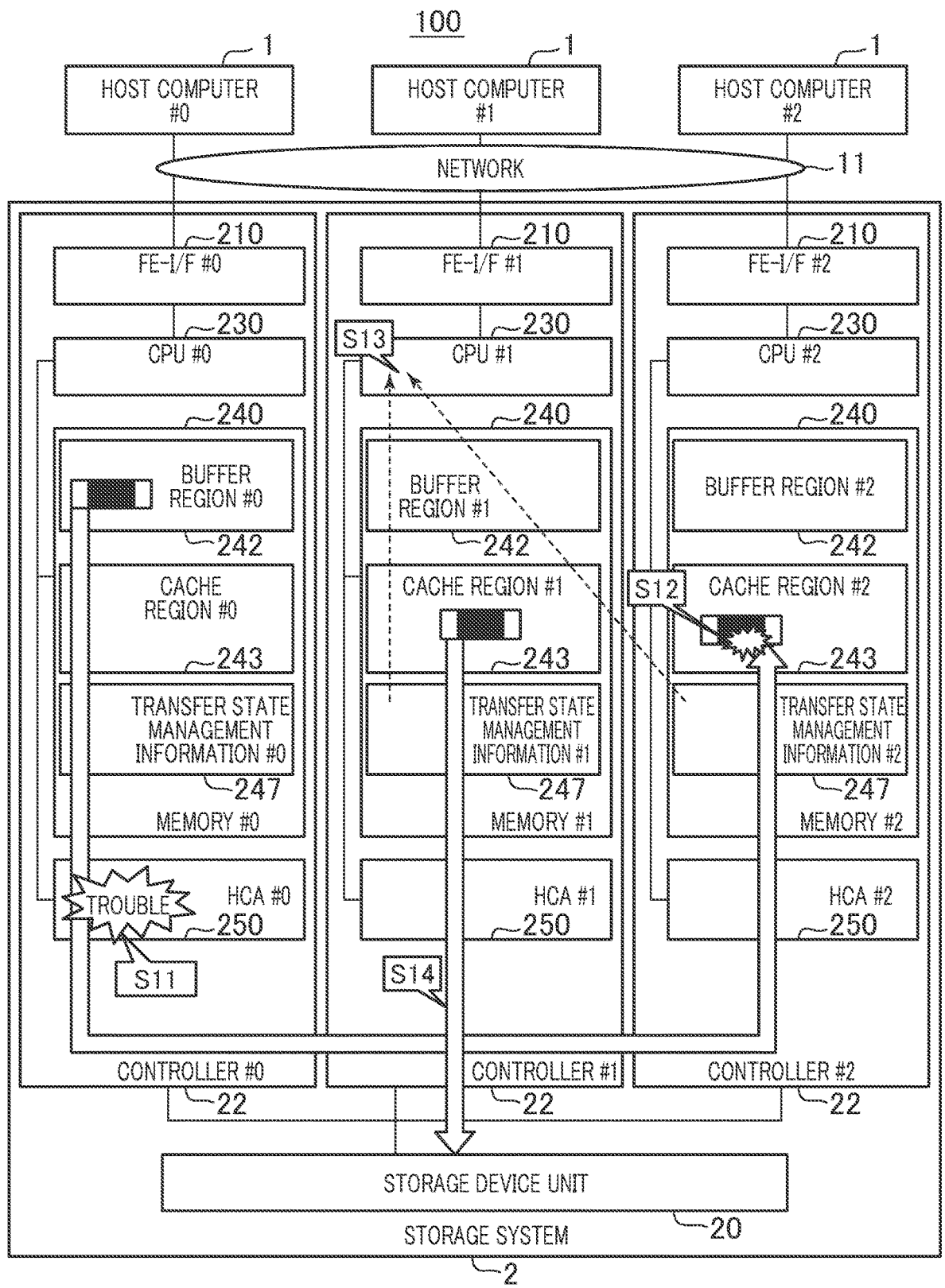
FIG. 2 is a diagram for explaining an outline of a write process when a trouble occurs in the storage system according to the first embodiment.

FIG. 2 is a diagram for explaining an outline of a write process when a trouble occurs in the storage system according to the first embodiment. FIG. 2 shows an outline of a write process when a trouble has occurred in the middle of the write process shown in FIG. 1.

When the HCA #0 receives a sequential transfer request from the CPU #1 and a trouble occurs at the HCAs 250 or a path or the like of a network (an HCA network 23 of FIG. 3) connecting the HCAs 250 to each other during the sequential transfer (Step S11), there is a risk that the write data (dirty data) in a dirty state stored in the cache region #1 or #2 is destructed (Step S12). Namely, there is a risk that the data becomes different data in which only a part of the dirty data is overwritten by a part of new write data.

Accordingly, the CPU #1 managing the write data specifies the cache region 243 holding normal dirty data by referring to the transfer state management information 247 (Step S13). Thereafter, the CPU #1 destages (namely, transfers to the storage device unit 20) the dirty data in the specified cache region 243 (Step S14). Further, the CPU #1 discards the dirty data in the cache regions #1 and #2 after completion of the destage. It should be noted that data in the cache regions 243 storing data corresponding to the destaged data is discarded after completion of the destage in the following description unless otherwise described.

The normal dirty data can be selected and written into the storage device unit 20 by the above-described process, and the consistency of the write data can be guaranteed.

Next, the computer system according to the embodiment will be described in detail.

Figure 3:
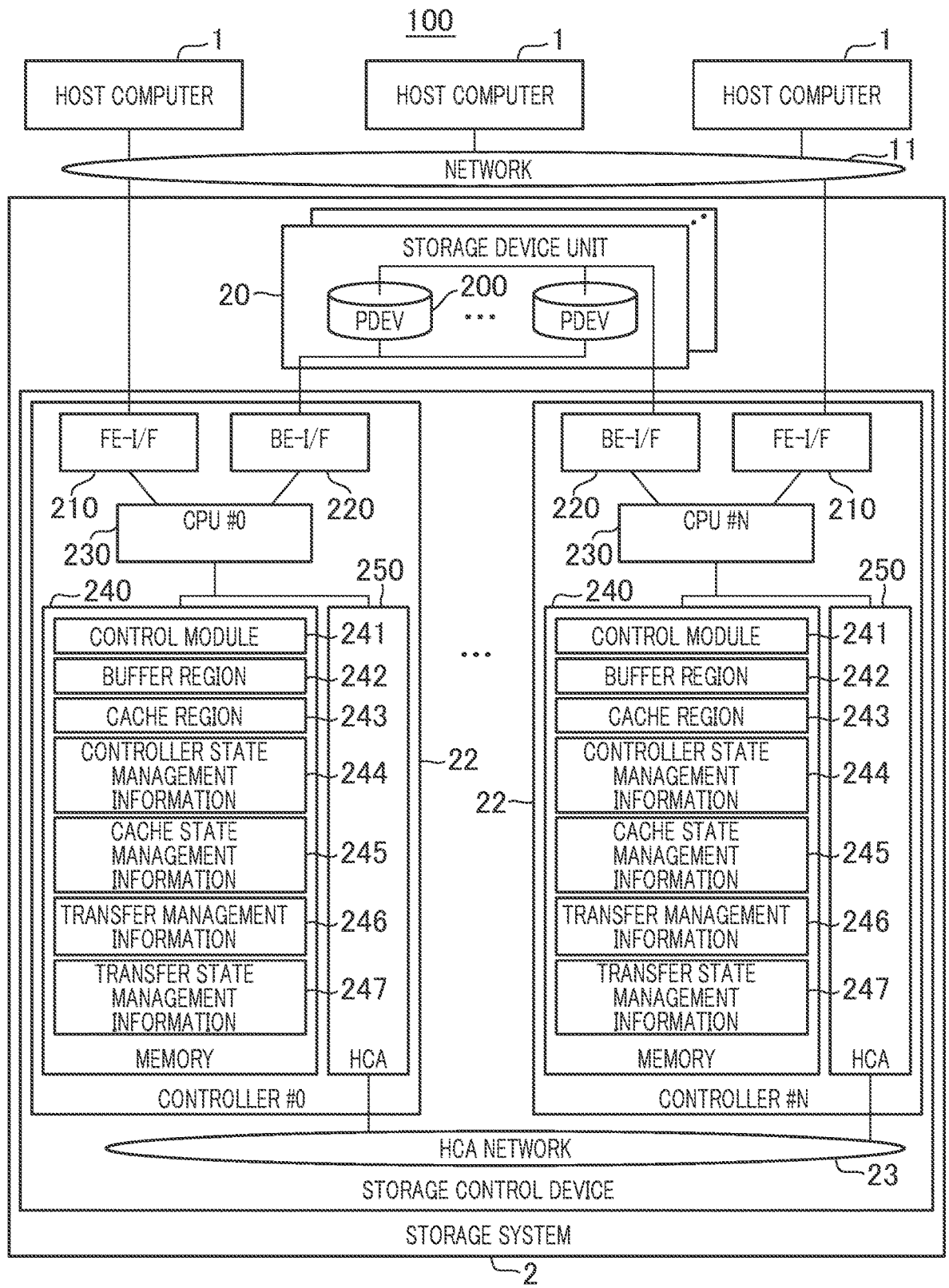
FIG. 3 is a configuration diagram of a computer system according to the first embodiment.

FIG. 3 is a configuration diagram of the computer system according to the first embodiment.

The computer system 100 includes one or more host computers 1 and the storage system 2. The host computers 1 and the storage system 2 are connected to each other via the network 11. The network 11 is, for example, a SAN (Storage Area Network).

The storage system 2 has plural (for example, three of more) controllers 22 (controllers 22 #0 to #N) and the storage device unit 20. The controllers 22 are mutually connected to each other via an HCA network 23. In order to improve the availability of the storage system 2, a dedicated power supply is prepared for each controller 22, and electricity may be fed to each controller 22 using the dedicated power supply.

Each controller 22 has communication interfaces, a storage device, and a processor connected thereto. The communication interfaces are, for example, an FE-I/F (Front End Inter/Face) 210, a BE-I/F (Back End Inter/Face) 220, and an HCA 250. The storage device is, for example, the memory 240. The processor is, for example, the CPU (Central Processing Unit) 230. It should be noted that each controller 22 includes one memory 240 in the configuration shown in FIG. 3, but may include a plurality of memories 240.

The FE-I/F 210 is an interface device for communicating with an external device located at a front end such as the host computer 1. The BE-I/F 220 is an interface device through which the controller 22 communicates with the storage device unit 20. The HCA 250 is an interface device for communicating with another HCA 250 to operate the memory 240 of each controller 22.

The memory 240 is, for example, a RAM (Random Access Memory), and includes the buffer region 242 and the cache region 243. In addition, the memory 240 stores a control module 241, controller state management information 244, cache state management information 245, transfer management information 246, and the transfer state management information 247. It should be noted that the memory 240 may be a non-volatile memory or a volatile memory.

The control module 241 is a module (program) for controlling the entire storage system 2 by being executed by the CPU 230. More specifically, the control module 241 controls an I/O process by being executed by the CPU 230.

The buffer region 242 is a region for temporarily storing the write data received from the host computer 1.

The cache region 243 is a region for caching the write data transmitted from the host computer 1 to the storage device unit 20. The cache region 243 stores the dirty data in some cases, and thus may be put in a non-volatile state by a backup power supply or the like.

The controller state management information 244 is information for managing whether each controller 22 is in a normal state or a breakdown state. The cache state management information 245 is information for managing each controller 22 having the cache region 243 used for duplication and the state of cache. The transfer management information 246 is information for managing each controller 22 having received the write data to be transferred in the sequential transfer and the entry address of the transfer state management information 247. The transfer state management information 247 is information for managing the progression status (transfer state) of the sequential transfer. The details of the controller state management information 244, the cache state management information 245, the transfer management information 246, and the transfer state management information 247 will be described later with reference to FIG. 4 to FIG. 7.

The storage device unit 20 has a plurality of PDEVs 200. Each PDEV 200 may be an HDD (Hard Disk Drive), but may be a storage device (non-volatile storage device) of a different kind, for example, an FM (Flash Memory) device such as an SSD (Solid State Drive). The storage device unit 20 may have PDEVs 200 of different kinds. In addition, a RAID group may be configured using a plurality of PDEVs 200 of the same kind. Data is stored into the RAID group in accordance with a predetermined RAID level. A guarantee code is given by the FE-I/F 210 to the write data received by the controller 22 from the host computer 1. The data with the guarantee code given is stored into the RAID group.

The HCA 250 receives an instruction from the CPU 230 to operate the memory 240 of the controller 22 of its own or to operate the memory 240 of another controller 22 via the HCA network 23.

Next, the controller state management information 244 will be described in detail.

FIG. 4 is a diagram for showing an example of a data structure of the controller state management information according to the first embodiment.

The controller state management information 244 stores an entry for each controller 22. The entry of the controller state management information 233 includes fields of a controller ID 401 and a state 402. The controller ID 401 stores the identifier (controller ID) of the controller 22 corresponding to the entry. The state 402 stores the operating state of the controller 22 corresponding to the entry. The operating state is "normal", "breakdown", or the like.

Next, the cache state management information 245 will be described in detail.

FIG. 5 is a diagram for showing an example of a data structure of the cache state management information according to the first embodiment.

The cache state management information 245 stores an entry for each data address. The entry of the cache state management information 245 includes fields of a data address 501, a first transfer destination controller ID 502, a second transfer destination controller ID 503, and a cache state 504.

The data address 501 stores a value (data address) showing the storage position of user data in the storage system 2 corresponding to the entry.

The first transfer destination controller ID 502 stores the identifier (controller ID: first transfer destination controller ID) of the controller 22 (an example of a transfer destination controller) having the cache region 243 of the transfer destination of the first transfer where the data of the data address corresponding to the entry is duplicated and cached.

The second transfer destination controller ID 503 stores the identifier (controller ID: second transfer destination controller ID) of the controller 22 (an example of an assigned controller) having the cache region 243 of the transfer destination of the second transfer where the data of the data address corresponding to the entry is duplicated and cached. In the embodiment, the second transfer destination controller ID 503 stores the controller ID of the controller (owner controller) 22 having the ownership of the logical unit to which the data of the data address corresponding to the entry belongs.

The cache state 504 stores information indicating the cache state of the data of the data address corresponding to the entry. The cache states include "dirty" indicating that data is not destaged in the storage device unit 20 and "clean" indicating that data is destaged.

Next, the transfer management information 246 will be described in detail.

FIG. 6 is a diagram for showing an example of a data structure of the transfer management information according to the first embodiment.

The transfer management information 246 stores an entry for each data address. The entry of the transfer management information 246 includes fields of a data address 601, a controller ID 602, and a transfer state management information address 603. The data address 601 stores a value (data address) showing the storage position (storage space) of user data in the storage system 2 corresponding to the entry. The controller ID 602 stores the identification information (controller ID) of the controller (reception controller) 22 having received the write data of the data address corresponding to the entry from the host 1. The transfer state management information address 603 stores a value (address) showing the storage place of the corresponding entry in the transfer state management information 247 of the data address corresponding to the entry.

Next, the transfer state management information 247 will be described in detail.

FIG. 7 is a diagram for showing an example of a data structure of the transfer state management information according to the first embodiment.

The transfer state management information 247 stores an entry for each data address. The entry of the transfer state management information 247 includes fields of a data address 701, a first transfer data reception flag 702, a first transfer completion flag 703, and a second transfer completion flag 704.

The data address 701 stores a value (data address) showing the storage position of user data in the storage system 2 corresponding to the entry. The first transfer data reception flag 702 stores a value (reception flag) indicating whether or not the data of the first transfer of the write data corresponding to the data address of the data address 701 has been received by the HCA 250. In the case where the data has been received, "1" is set to the reception flag. In the case where the data has not been received, "0" is set to the reception flag. The first transfer completion flag 703 stores a value (first transfer completion flag) indicating whether or not the first transfer of the write data of the data address corresponding to the data address 701 has been completed by the HCA 250. In the case where the first transfer has been completed, "1" is set to the first transfer completion flag. In the case where the first transfer has not been completed, "0" is set to the first transfer completion flag. The second transfer completion flag 704 stores a value (second transfer completion flag) indicating whether or not the second transfer of the write data of the data address corresponding to the data address 701 has been completed by the HCA 250. In the case where the second transfer has been completed, "1" is set to the second transfer completion flag. In the case where the second transfer has not been completed, "0" is set to the second transfer completion flag.

Next, a processing operation by the computer system according to the first embodiment will be described.

First, a sequential transfer request process will be described.

Figure 8:
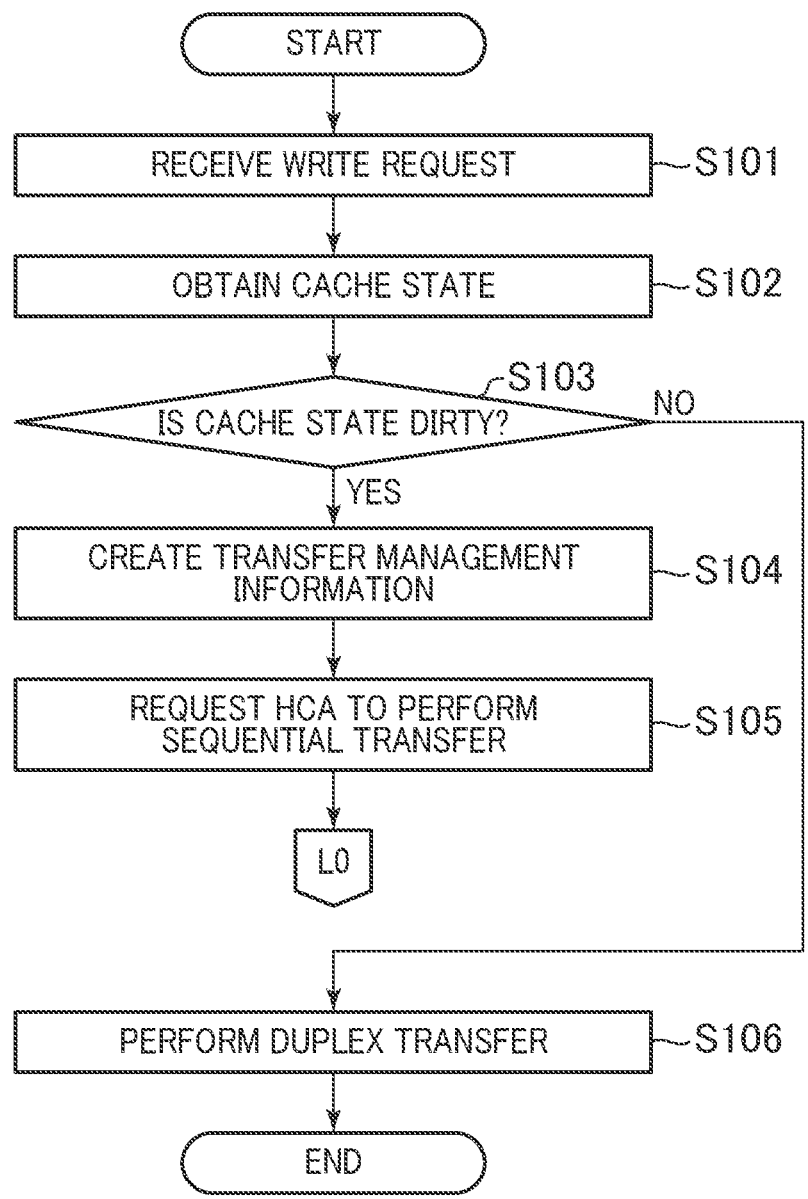
FIG. 8 is a flowchart of a sequential transfer request process according to the first embodiment.

FIG. 8 is a flowchart of the sequential transfer request process according to the first embodiment.

The sequential transfer request process is executed when the controller 22 (referred to as an owner controller 22: an example of the assigned controller) having the ownership of the logical unit (storage space) in the target storage device unit 20 for the write data (new data) corresponding to a write request receives the write request. Here, the cases in which the write request is transmitted to the owner controller 22 include a case in which the write request is directly transmitted from the host computer 1 to the owner controller 22 and a case in which the write request is transferred to the owner controller 22 from the controller 22 (referred to as an FE controller 22 and an example of the reception controller) that does not have the cache region 243 corresponding to the write data corresponding to the write request and has received the write data from the host computer 1 via the FE-I/F 210.

In the embodiment, the case in which the write request has been transferred from the FE controller 22 to the owner controller 22 will be described as an example.

The owner controller 22 receives the write request (Step S101). Next, the owner controller 22 refers to the cache state management information 245 to obtain the cache state from the cache state 504 of the entry corresponding to the data address of the write request (Step S102), and determines whether or not the cache state is dirty (Step S103).

As a result, in the case where it is determined that the cache state is not dirty (Step S103: NO), it means the data (old data) of the cache region 243 has been already stored in the storage device unit 20. Thus, the owner controller 22 simultaneously (parallelly) transfers the write data to the cache regions 243 of two controllers 22, and the process is finished (S106).

On the other hand, in the case where it is determined that the cache state is dirty (Step S103: YES), the owner controller 22 obtains a value (transfer state management information address) indicating the storage destination of the entry of the transfer state management information 247 corresponding to the data address of the write request, and adds an entry to the transfer management information 246. The owner controller 22 sets the data address of the write data, the controller ID of the FE controller 22, and the transfer state management information address of the entry of the transfer state management information 247 to the data address 601, the controller ID 602, and the transfer state management information address 603 of the added entry, respectively (Step S104).

Next, the owner controller 22 requests the HCA 250 in the FE controller 22 to perform the sequential transfer of the write data (Step S105), and executes the next process (a sequential transfer completion waiting process of FIG. 9) (LO). It should be noted that the request to the HCA 250 of the FE controller 22 may be notified via the HCA 250 of the own controller 22.

Next, the sequential transfer completion waiting process will be described.

Figure 9:
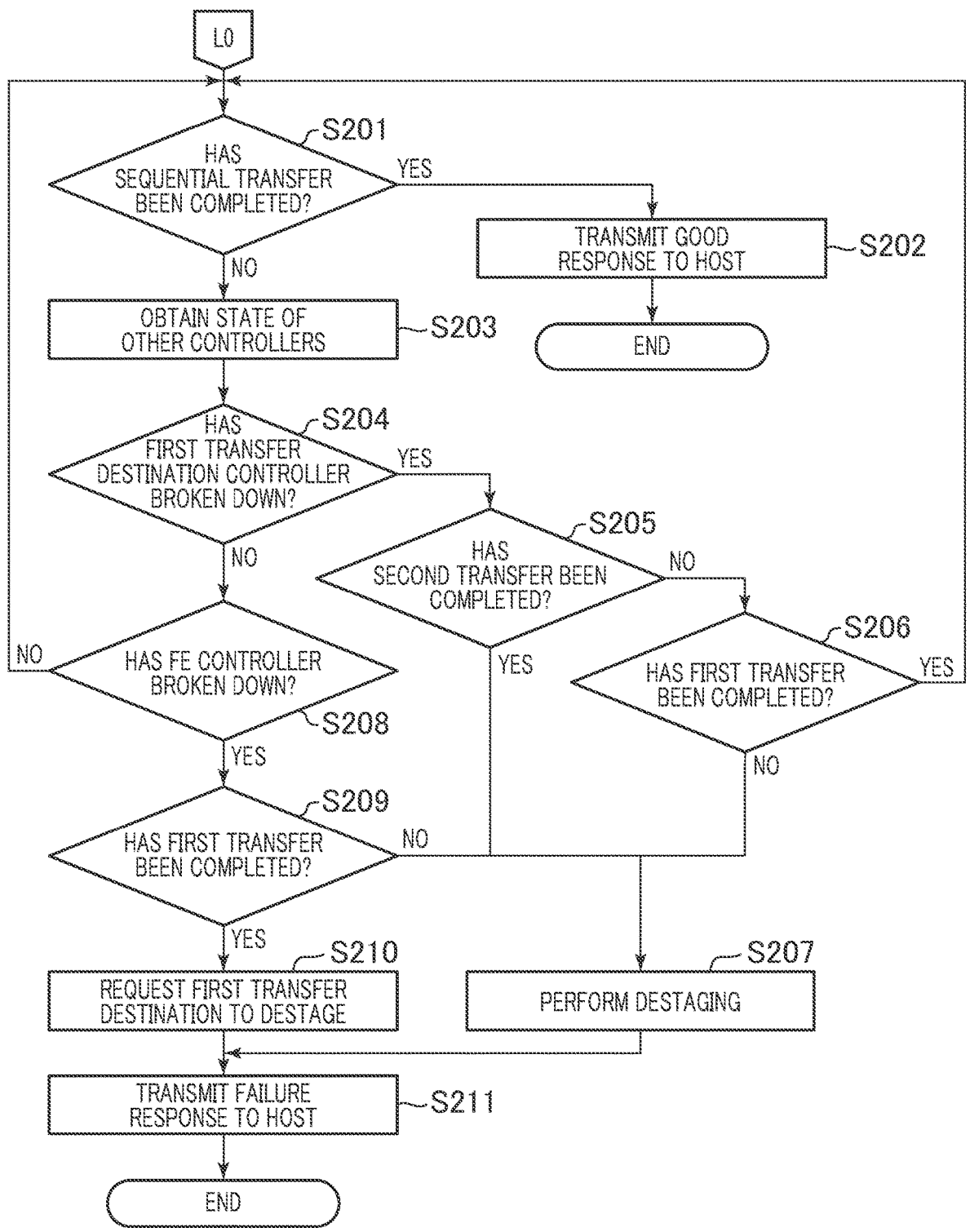
FIG. 9 is a flowchart of a sequential transfer completion waiting process according to the first embodiment.

FIG. 9 is a flowchart of the sequential transfer completion waiting process according to the first embodiment.

The owner controller 22 determines whether or not the sequential transfer has been completed (Step S201). Namely, the owner controller 22 refers to the transfer state management information 247 to determine whether or not flags of the first transfer completion flag 703 and the second transfer completion flag 704 in the entry corresponding to the data address of the write data, namely, the entry in which the value of the data address 701 is the data address of the write data are set on, namely, whether or not the values of the flags are "1". It should be noted that the process of the step may be performed at a fixed cycle.

As a result, in the case where it is determined that the sequential transfer has been completed (Step S201: YES), the owner controller 22 transmits to the host 1 a Good response meaning that the write process has been finished via the FE controller 22 (Step S202), and finishes the process. On the other hand, in the case where it is determined that the sequential transfer has not been completed (Step S201: NO), the owner controller 22 obtains the state of another controller 22 from the controller state management information 244, and specifies a controller ID (breakdown controller ID) in a breakdown state (Step S203).

Next, the owner controller 22 determines whether or not the transfer destination controller 22 (first transfer destination controller 22) of the first transfer has broken down (Step S204). Specifically, the owner controller 22 determines whether or not the first transfer destination controller 22 has broken down on the basis of whether or not the first transfer destination ID of the first transfer destination controller ID 502 stored in the data address 501 in the entry of the cache state management information 245 corresponding to the data address matches any one of the breakdown controller IDs specified in Step S203.

As a result, in the case where it is determined that the first transfer destination controller 22 has broken down (Step S204: YES), the owner controller 22 determines whether or not the second transfer has been completed (Step S205). Namely, the owner controller 22 refers to the transfer state management information 247 to determine whether or not the flag of the second transfer completion flag 704 of the entry corresponding to the data address is set on.

As a result, in the case where it is determined that the second transfer has been completed (Step S205: YES), it means the write data has been stored into the cache region 243 of the second transfer destination controller (owner controller 22) by the second transfer, and thus the owner controller 22 destages (transfers to the storage device unit 20) the write data (guarantee data) stored in the cache region 243 of the owner controller 22 (Step S207). Next, the owner controller 22 transmits a failure response to the host 1 via the FE controller 22, and finishes the process (Step S211).

Here, in the case where the second transfer has been completed (Step S205: YES), it means the write data of the cache region 243 of the controller 22 (the second transfer destination controller 22 or the owner controller) as the transfer destination of the second transfer is not destroyed, and thus the consistency of the data can be guaranteed by destaging the write data of the cache region 243.

On the other hand, in the case where it is determined that the second transfer has not been completed (Step S205: NO), the owner controller 22 determines whether or not the first transfer has been completed (Step S206). Namely, the owner controller 22 refers to the transfer state management information 247 to determine whether or not the flag of the first transfer completion flag 703 of the entry corresponding to the data address is set on.

As a result, in the case where it is determined that the first transfer has been completed (Step S206: YES), the owner controller 22 advances the process to Step S201, and waits for completion of the second transfer.

On the other hand, in the case where it is determined that the first transfer has not been completed (Step S206: NO), the owner controller 22 advances the process to Step S207.

Here, in the case where the first transfer has not been completed, it means the first transfer destination controller 22 has broken down before the start of the second transfer. Thus, the dirty data of the cache region 243 of the owner controller 22 that is the second transfer destination controller has not been updated, and the consistency of the data can be guaranteed by destaging the dirty data (guarantee data) of the cache region 243.

On the other hand, in the case where it is determined that the first transfer destination controller 22 has not broken down in Step S204 (S204: NO), the owner controller 22 determines whether or not the FE controller 22 has broken down (Step S208). Namely, the owner controller 22 refers to the transfer management information 246, and obtains the controller ID of the controller ID 602 of the entry corresponding to the data address to determine whether or not the FE controller 22 has broken down on the basis of whether or not the controller ID matches any one of the breakdown controller IDs specified in Step S203.

As a result, in the case where it is determined that the FE controller 22 has not broken down (Step S208: NO), the owner controller 22 returns the process to Step S201, and waits for completion of the sequential transfer.

On the other hand, in the case where it is determined that the FE controller 22 has broken down (Step S208: YES), the owner controller 22 determines whether or not the first transfer has been completed (Step S209). Namely, the owner controller 22 refers to the transfer state management information 247 to determine whether or not the flag of the first transfer completion flag 703 of the entry corresponding to the data address is set on. It should be noted that it may be determined whether or not the flag of the first transfer data reception flag 702 is set on instead of determining using the flag of the first transfer completion flag 703. In addition, it is determined whether or not the second transfer has been completed before Step S209. In the case where the second transfer has been completed, the process may be finished by transmitting the Good response to the host 1.

As a result, in the case where it is determined that the first transfer has been completed (Step S209: YES), the owner controller 22 requests the controller 22 of the first transfer destination to destage the data (guarantee data) from the cache region 243 of the controller 22 (Step S210), and advance the process to Step 211. It should be noted that the controller 22 of the first transfer destination destages the data of the cache region 243 in accordance with the request. Here, in the case where the first transfer has been completed, the write data of the cache region 243 of the first transfer destination controller 22 is not destroyed. Thus, the consistency of the data can be guaranteed by destaging the write data of the cache region 243.

On the other hand, in the case where it is determined that the first transfer has not been completed (Step S209: NO), the owner controller 22 advances the process to Step S207, and destages the write data (guarantee data) of the cache region 243 of its own. Here, in the case where the first transfer has not been completed, the FE controller 22 has broken down before the start of the second transfer. Thus, the dirty data of the cache region 243 of the owner controller 22 has not been updated, and the consistency of the data can be guaranteed by destaging the dirty data of the cache region 243.

Next, a sequential transfer process will be described.

Figure 10:
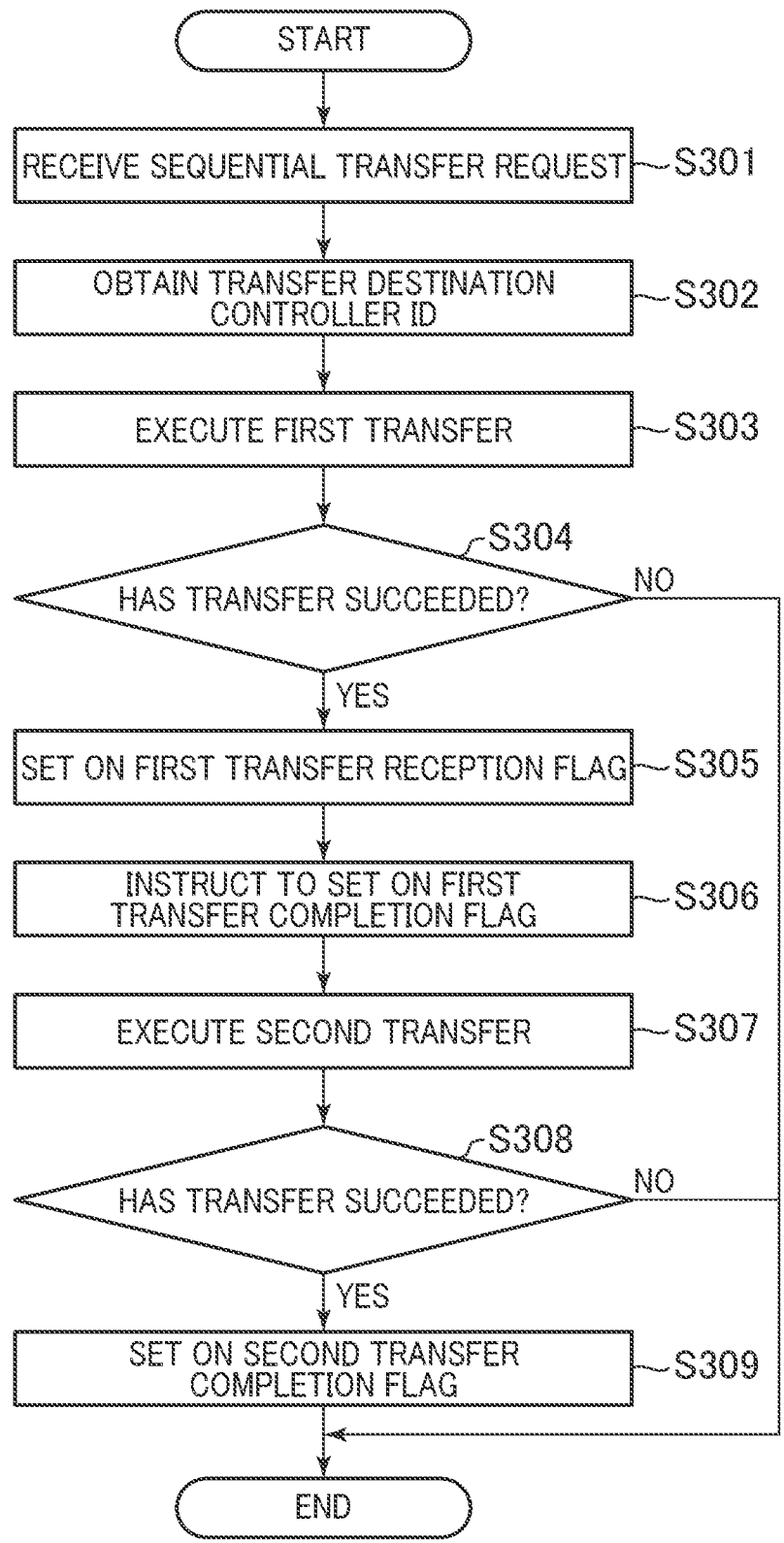
FIG. 10 is a flowchart of a sequential transfer process according to the first embodiment.

FIG. 10 is a flowchart of the sequential transfer process according to the first embodiment.

The FE controller 22 (specifically, the HCA 250 of the FE controller 22) receives a sequential transfer request transmitted from the owner controller 22, and obtains the data address of the write data from the sequential transfer request (Step S301). Next, the FE controller 22 refers to the cache state management information 245 to obtain the first transfer destination controller ID and the second transfer destination controller ID from the first transfer destination controller ID 502 and the second transfer destination controller ID 503, respectively, in the entry corresponding to the data address (Step S302).

Next, the HCA 250 of the FE controller 22 executes the first transfer (Step S303). Specifically, the HCA 250 of the FE controller 22 extracts the write data from the buffer region 242, and transfers the write data to the cache region 243 via the HCA 250 of the first transfer destination controller 22 (Step S303). In this case, the write data is transferred to the cache region 243 without passing through the buffer region 242 of the first transfer destination controller 22 and without involvement of the CPU 230 of the first transfer destination controller 22.

Next, the HCA 250 of the FE controller 22 determines whether or not the transfer of the write data has succeeded (Step S304).

As a result, in the case where it is determined that the transfer has failed (Step S304: NO), the HCA 250 of the FE controller 22 finishes the sequential transfer process.

On the other hand, in the case where it is determined that the transfer has succeeded (Step S304: YES), the HCA 250 of the FE controller 22 sets on the flag of the first transfer data reception flag 702 in the entry corresponding to the data address of the transfer state management information 247 existing in the memory 240 of the first transfer destination controller 22, namely, sets the flag to 1 (Step S305).

Next, the HCA 250 of the FE controller 22 instructs the HCA 250 of the first transfer destination controller 22 to set on the flag of the first transfer completion flag 703 in the entry corresponding to the data address of the transfer state management information 247 existing in the memory 240 of the second transfer destination controller 22 (Step S306).

Next, the HCA 250 of the FE controller 22 executes the second transfer (Step S307). Specifically, the HCA 250 of the FE controller 22 extracts the write data from the buffer region 242, and transfers the write data to the cache region 243 via the HCA 250 of the second transfer destination controller 22 (Step S307).

Next, the HCA 250 of the FE controller 22 determines whether or not the transfer of the write data has succeeded (Step S308).

As a result, in the case where it is determined that the transfer has failed (Step S308: NO), the FE controller 22 finishes the sequential transfer process.

On the other hand, in the case where it is determined that the transfer has succeeded (Step S308: YES), the HCA 250 of the FE controller 22 sets on the flag of the second transfer completion flag 704 in the entry corresponding to the data address of the transfer state management information 247 existing in the memory 240 of the second transfer destination controller 22, namely, sets the flag to 1 (Step S309), and finishes the process.

Next, a trouble handling process will be described.

Figure 11:
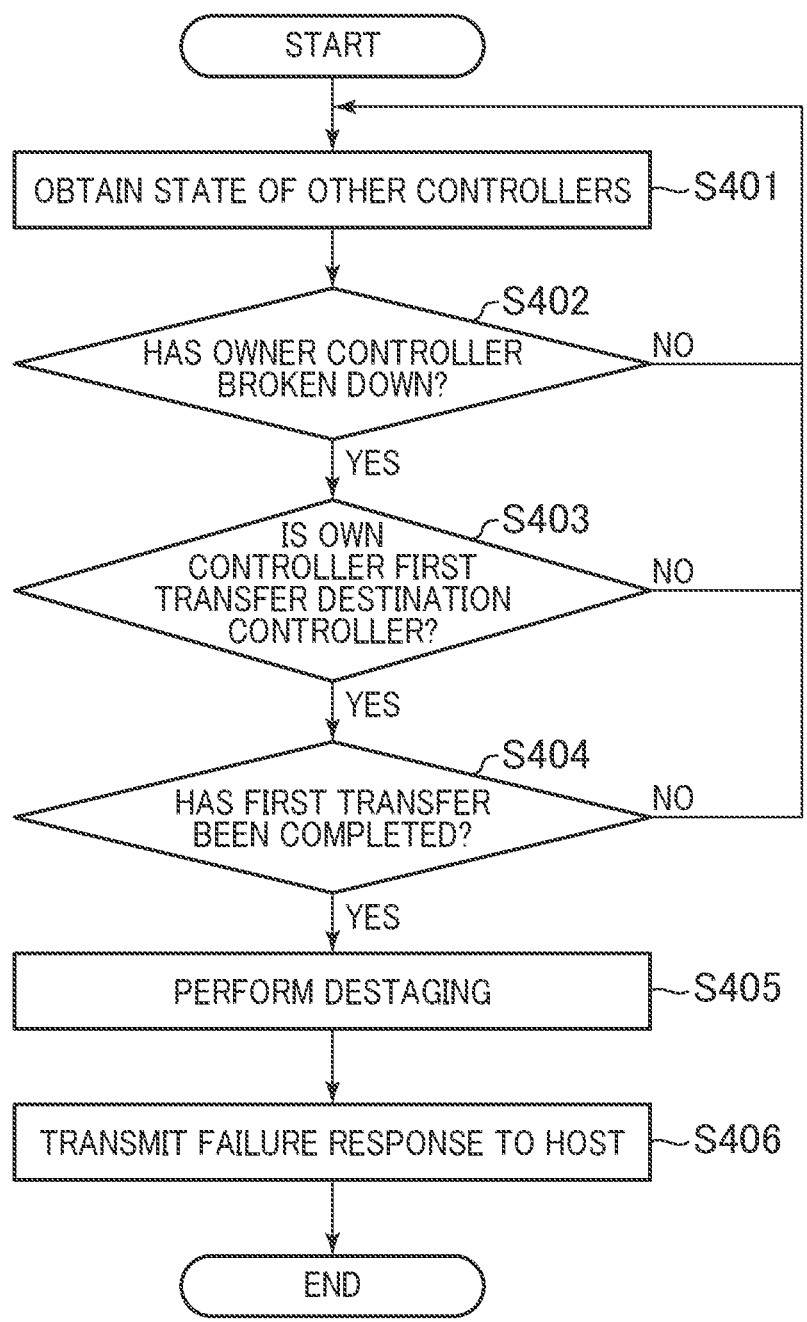
FIG. 11 is a flowchart of a trouble handling process according to the first embodiment.

FIG. 11 is a flowchart for showing the trouble handling process according to the first embodiment. The trouble handling process is a process executed by the controller 22 other than the owner controller 22. The trouble handling process may be executed once every fixed time, or may be executed when a trouble is detected by the controller 22.

The controller 22 obtains the states of the other controllers 22 from the controller state management information 244, and specifies the controller ID 401 (breakdown controller ID) in a breakdown state (Step S401).

Next, the controller 22 determines whether or not the owner controller 22 (second transfer destination controller 22) has broken down (Step S402). Namely, the owner controller 22 determines whether or not the owner controller 22 has broken down on the basis of whether or not the trouble controller ID matches any one of the controller IDs of the second transfer destination controller ID 503 in the entry of the cache state management information 245 corresponding to the data address.

As a result, in the case where it is determined that the owner controller 22 has not broken down (Step S402: NO), the controller 22 returns the process to Step S401. On the other hand, in the case where it is determined that the owner controller 22 has broken down (Step S402: YES), the controller 22 determines whether or not the controller itself (own controller) is the first transfer destination controller (Step S403). Namely, the controller 22 determines whether or not the controller ID (own controller ID) of its own is the same as the controller ID of the first transfer destination controller ID 503 in the entry of the cache state management information 245 corresponding to the data address. It should be noted that instead of the above process, it may be determined whether or not the own controller is the FE controller, namely, whether or not the own controller ID is the same as the controller ID of the controller ID 602 in the entry corresponding to the data address of the transfer management information 246. In the case where the own controller is the FE controller, the subsequent processes may be performed.

As a result of the determination in Step S403, in the case where it is determined that the own controller is not the first transfer destination controller (Step S403: NO), the controller 22 advances the process to Step S401.

On the other hand, in the case where it is determined that the own controller is the first transfer destination controller (Step S403: YES), the controller 22 determines whether or not the first transfer has been completed (Step S404). Namely, the controller 22 refers to the entry of the transfer state management information 247 using the address of the transfer state management information address 603 in the entry corresponding to the data address of the transfer management information 246, and determines whether or not the flag of the first transfer data reception flag 702 of the entry is set on.

As a result of the determination, in the case where it is determined that the first transfer has not been completed (Step S404: NO), the controller 22 advances the process to Step S401, and waits for completion of the first transfer.

On the other hand, in the case where it is determined that the first transfer has been completed (Step S404: YES), the controller 22 destages the write data (guarantee data) of the cache region 243 (Step S405), and transmits a failure response to the host 1 via the FE controller 22 (Step S406) to finish the process. Here, in the case where the first transfer has been completed (Step S404: YES), the write data of the cache region 243 of the first transfer destination controller 22 is not destroyed, and thus the consistency of the data can be guaranteed by destaging the write data of the cache region 243.

As described above, in the computer system according to the above-described embodiment, the consistency of the write data can be guaranteed by properly using the cache region 243 for writing the data into the storage device unit 20 when a trouble occurs in accordance with the progress of the duplex process of the write data.

Second Embodiment

Next, a computer system according to a second embodiment will be described.

The computer system according to the second embodiment is a system that does not limit controllers 22 serving as logical units to a specific one in the computer system according to the first embodiment shown in FIG. 3, namely, does not set the ownership of the logical unit. In the computer system, for example, a controller (reception controller) having received a write request from a host 1 serves as an assigned controller.

In the computer system according to the second embodiment, a controller 22 (FE controller 22) having received the write request from the host 1 executes the sequential transfer request process shown in FIG. 8.

Next, a sequential transfer completion waiting process will be described.

Figure 12:
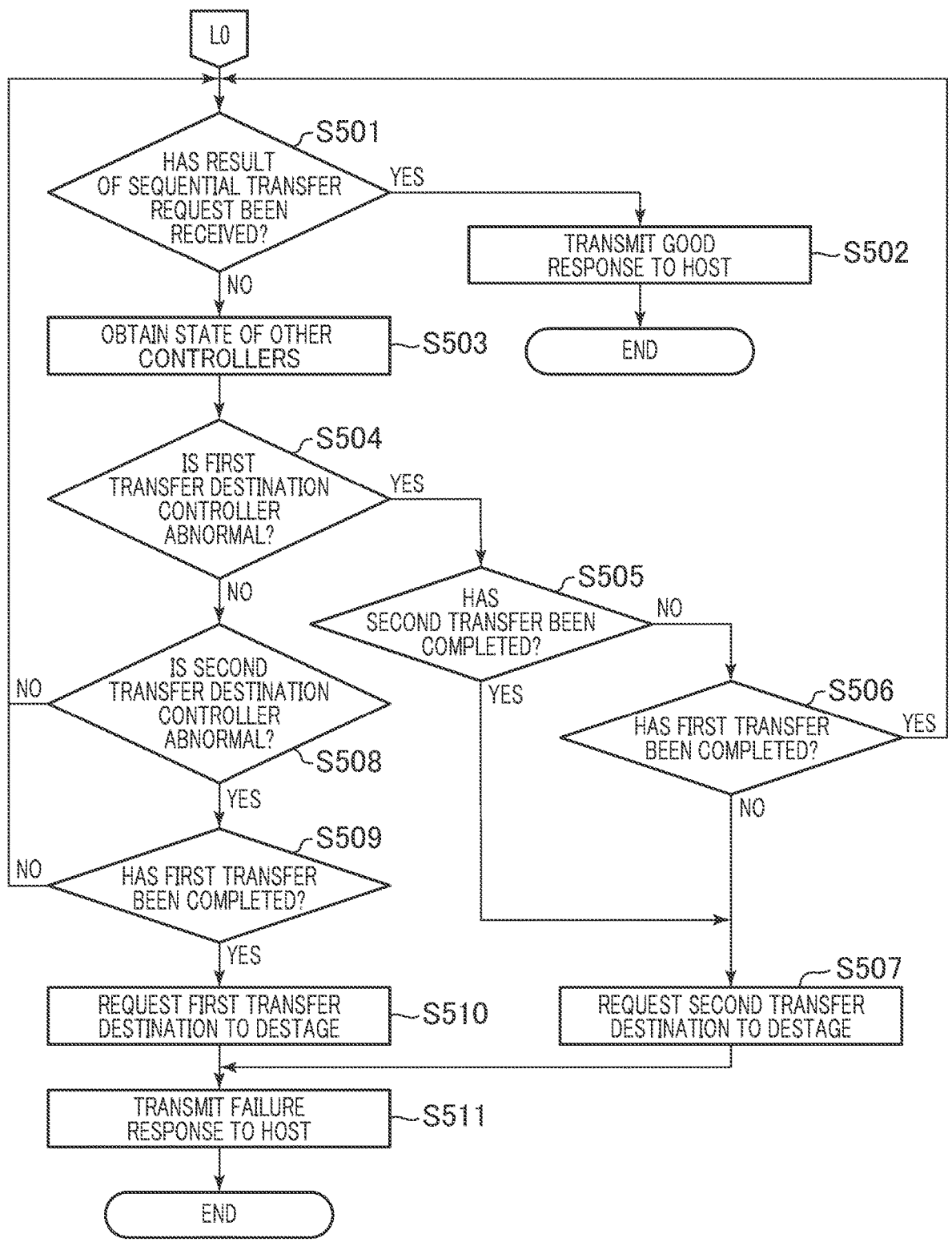
FIG. 12 is a flowchart of a sequential transfer completion waiting process according to a second embodiment.

FIG. 12 is a flowchart of the sequential transfer completion waiting process according to the second embodiment.

The FE controller 22 determines whether or not the sequential transfer has been completed (Step S501). Namely, the FE controller 22 refers to the transfer state management information 247 to determine whether or not flags of the first transfer completion flag 703 and the second transfer completion flag 704 in the entry corresponding to the data address of the write data, namely, the entry in which the value of the data address 701 is the data address of the write data are set on, namely, whether or not the values of the flags are "1".

As a result, in the case where it is determined that the sequential transfer has been completed (Step S501: YES), the FE controller 22 transmits a Good response to the host 1 (Step S502), and finishes the process. On the other hand, in the case where it is determined that the sequential transfer has not been completed (Step S501: NO), the FE controller 22 obtains the states of the other controllers 22 from the controller state management information 244, and specifies a controller ID (breakdown controller ID) in a breakdown state (Step S503).

Next, the owner controller 22 determines whether or not the transfer destination controller 22 (first transfer destination controller 22) of the first transfer has broken down (Step S504).

As a result, in the case where it is determined that the first transfer destination controller 22 has broken down (Step S504: YES), the FE controller 22 determines whether or not the second transfer has been completed (Step S505). Namely, the FE controller 22 refers to the transfer state management information 247 to determine whether or not the flag of the second transfer completion flag 704 of the entry corresponding to the data address is set on.

As a result, in the case where it is determined that the second transfer has been completed (Step S505: YES), the FE controller 22 requests to destage the write data (guarantee data) stored in the cache region 243 of the controller 22 of the second transfer destination (Step S507). Next, the FE controller 22 transmits a failure response to the host 1, and finishes the process (Step S511).

Here, in the case where the second transfer has been completed (Step S505: YES), it means the write data of the cache region 243 of the controller 22 (second transfer destination controller 22) of the second transfer destination is not destroyed, and thus the consistency of the data can be guaranteed by destaging the write data of the cache region 243.

On the other hand, in the case where it is determined that the second transfer has not been completed (Step S505: NO), the FE controller 22 determines whether or not the first transfer has been completed (Step S506).

As a result, in the case where it is determined that the first transfer has been completed (Step S506: YES), the FE controller 22 advances the process to Step S501, and waits for completion of the second transfer.

On the other hand, in the case where it is determined that the first transfer has not been completed (Step S506: NO), the FE controller 22 advances the process to Step S507.

Here, in the case where the first transfer has not been completed, it means the first transfer destination controller 22 has broken down before the start of the second transfer. Thus, the dirty data of the cache region 243 of the second transfer destination controller has not been updated, and the consistency of the data can be guaranteed by destaging the dirty data of the cache region 243.

On the other hand, in the case where it is determined that the first transfer destination controller 22 has not broken down in Step S504 (S504: NO), the FE controller 22 determines whether or not the second transfer destination controller 22 has broken down (Step S508). Namely, the FE controller 22 refers to the cache state management information 245, and obtains the controller ID of the second transfer destination controller ID 503 of the entry corresponding to the data address to determine whether or not the second transfer destination controller 22 has broken down on the basis of whether or not the controller ID matches any one of the breakdown controller IDs specified in Step S503.

As a result, in the case where it is determined that the second transfer destination controller 22 has not broken down (Step S508: NO), the FE controller 22 returns the process to Step S501, and waits for completion of the sequential transfer.

On the other hand, in the case where it is determined that the second transfer destination controller 22 has broken down (Step S508: YES), the FE controller 22 determines whether or not the first transfer has been completed (Step S509).

As a result, in the case where it is determined that the first transfer has not been completed (Step S509: NO), the FE controller 22 advances the process to Step S501, and waits for completion of the first transfer.

On the other hand, in the case where it is determined that the first transfer has been completed (Step S509: YES), the FE controller 22 requests the first transfer destination controller 22 to destage the data (guarantee data) from the cache region 243 of the controller 22 (Step S510), and advances the process to Step S511. Here, in the case where the first transfer has been completed, the write data of the cache region 243 of the first transfer destination controller 22 is not destroyed, and thus the consistency of the data can be guaranteed by destaging the write data of the cache region 243.

Next, a sequential transfer process will be described.

The sequential transfer process of the computer system according to the second embodiment is different from that shown in FIG. 10 in processing content of Step S306 and Step S309.

In the computer system according to the second embodiment, in Step S306, the HCA 250 of the controller 22 sets on the flag of the first transfer completion flag 703 of the entry of the transfer state management information 247 corresponding to the data address existing in the memory 240 of the own controller 22. In addition, in Step S309, the HCA 250 of the controller 22 sets on the flag of the second transfer completion flag 704 of the entry of the transfer state management information 247 corresponding to the data address existing in the memory 240 of the own controller 22.

Next, a trouble handling process will be described.

Figure 13:
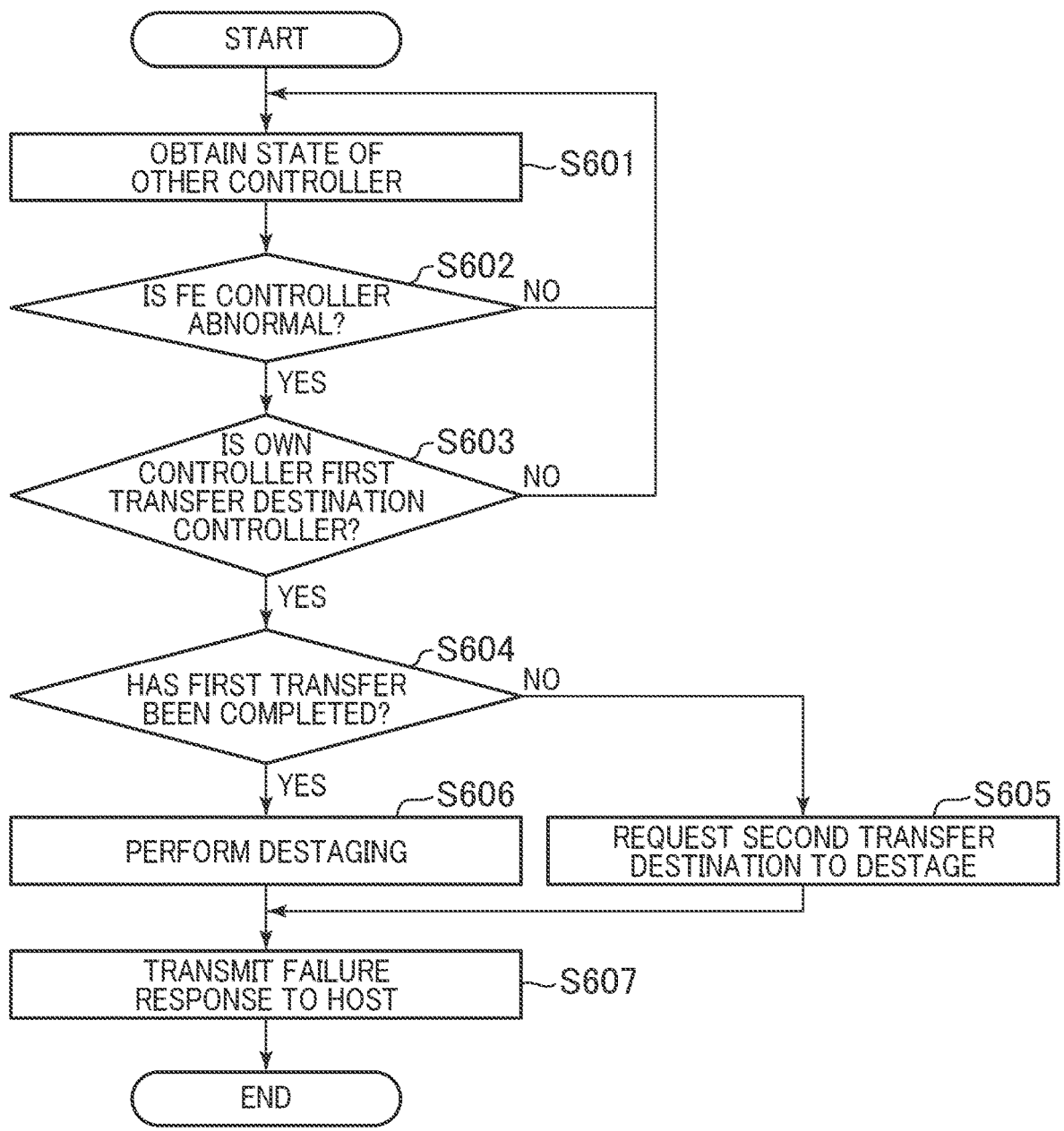
FIG. 13 is a flowchart of a trouble handling process according to the second embodiment.

FIG. 13 is a flowchart of the trouble handling process according to the second embodiment.

The trouble handling process is a process executed by a controller (different controller) other than the FE controller 22. The trouble handling process may be executed once every fixed time, or may be executed when a trouble of the different controller 22 is detected.

The controller 22 obtains the states of the other controllers 22 from the controller state management information 244, and specifies the controller ID (breakdown controller ID) in a breakdown state (Step S601). Next, the controller 22 determines whether or not the FE controller 22 has broken down (Step S602).

As a result, in the case where it is determined that the FE controller 22 has not broken down (Step S602: NO), the controller 22 returns the process to Step S601. On the other hand, in the case where it is determined that the FE controller 22 has broken down (Step S602: YES), the controller 22 determines whether or not the controller itself (own controller) is the first transfer destination controller (Step S603). It should be noted that instead of the above process, it may be determined whether or not the own controller is the second transfer destination controller, and the subsequent processes may be performed.

As a result of the determination in Step S603, in the case where it is determined that the own controller 22 is not the first transfer destination controller (Step S603: NO), the controller 22 advances the process to Step S601.

On the other hand, in the case where it is determined that the own controller is the first transfer destination controller (Step S603: YES), the controller 22 determines whether or not the first transfer has been completed (Step S604).

As a result of the determination, in the case where it is determined that the first transfer has been completed (Step S604: YES), the controller 22 destages the write data (guarantee data) of the cache region 243 (Step S606), and transmits a failure response to the host 1 via the FE controller 22 (Step S607) to finish the process. Here, in the case where the first transfer has been completed (Step S604: YES), the write data of the cache region 243 of the first transfer destination controller 22 is not destroyed, and thus the consistency of the data can be guaranteed by destaging the write data of the cache region 243.

On the other hand, in the case where it is determined that the first transfer has not been completed (Step S604: NO), the controller 22 requests the controller 22 of the second transfer destination to destage the write data (guarantee data) stored in the cache region 243 (Step S605), and advances the process to Step S607. Here, in the case where the first transfer has not been completed (Step S604: NO), the first transfer destination controller 22 has broken down before the start of the second transfer. Thus, the dirty data of the cache region 243 of the second transfer destination controller 22 has not been updated, and the consistency of the data can be guaranteed by destaging the dirty data of the cache region 243.

As described above, in the computer system according to the above-described embodiment, the consistency of the write data can be guaranteed by properly using the cache region 243 for writing the data into the storage device unit 20 when a trouble occurs in accordance with the progress of the duplex process of the write data.

It should be noted that the present invention is not limited to the above-described embodiments, and includes various modified examples. In addition, for example, the configurations of the embodiments have been described in detail to easily understand the present invention, and the embodiments are not necessarily limited to those including all the configurations described above. In addition, some configurations of each embodiment can be added to, deleted from, and replaced by other configurations.

In addition, some or all of the above-described configurations, functions, processing units, processing means, and the like may be realized by hardware by designing with, for example, integrated circuits. In addition, the present invention may be realized by a program code of software (data management program) realizing the functions of the embodiments. In this case, a storage medium recording the program code is provided to a computer, and a processor included in the computer reads the program code stored in the storage medium. In this case, the program code itself read from the storage medium realizes the functions of the above-described embodiments, and the program code itself and the storage medium storing the same configure the present invention. The storage medium supplying such a program code is, for example, a flexible disk, a CD-ROM, a DVD-ROM, a hard disk, an SSD (Solid State Drive), an optical disk, a magneto-optical disk, a CD-R, a magnetic tape, a non-volatile memory card, a ROM, or the like.

In addition, the program code realizing the functions described in the embodiments may be implemented by, for example, an assembler, a wide range of programs such as C/C++, perl, Shell, PHP, and Java (registered trademark), or script language.

Further, the program code of software realizing the functions of the embodiments is distributed via a network to be stored into storage means of a computer such as a hard disk or a memory, or a storage medium such as a CD-RW or CD-R, and a processor included in the computer may read and execute the program code stored in the storage means or storage medium.

In the above-described embodiments, the control lines and the information lines considered to be necessary in the explanation are shown, but all the control lines and the information lines in a product are not necessarily shown. All the configurations may be connected to each other.

Further, in the above-described embodiments, in the case where data cannot be duplicated on the cache regions 243 of the controllers 22, the consistency of the data can be guaranteed by destaging normal data to the storage device unit 20. However, the present invention is not limited to this. For example, in the case where data cannot be duplicated on the cache regions 243 of the controllers 22, normal data may be copied to the cache region 243 of the controller 22 that can normally operate, and may be duplicated on the cache regions 243 of the controllers 22.

In addition, in the above-described embodiments, the write data is duplicated on the cache regions 243 of the controllers 22. However, the present invention is not limited to this, and the write data may be multiplexed into three or more pieces of data.

What is claimed is:

1. A storage system comprising:
a plurality of controllers;
a storage device unit into which data can be stored; and
wherein the controller includes:
a processor unit; and
a memory,
wherein in the case where new data according to a write request is stored into a first memory of a first controller, the first controller transfers the new data from the first memory storing the new data corresponding to the write request to a second memory of a second controller and transfers the data to a third memory of a third controller,
wherein in the case where a state of old data of the second memory and the third memory related to new data according to the write request is dirty, transfer is performed separately on the second memory and the third memory and the old data is overwritten, and
in the case where a state of old data of the second memory and the third memory is not dirty, transfer is performed in parallel on the second memory and the third memory and the old data is overwritten.

2. The storage system according to claim 1,
wherein in the case where the transfer is performed separately, after success of another transfer to the second memory is confirmed, transfer to the third memory is performed and a process is performed, in the case where a problem occurs at the time of the transfer, by use of the new data or old data that is not damaged due to the problem.

3. The storage system according to claim 2,
wherein in the case where a problem occurs at the time of the transfer,
when either of transfer of the second memory or the third memory is performed normally, normally transferred new data is destaged in the storage device unit, and
when either of transfer of the second memory or the third memory is not performed normally, old data already stored in the second memory or the third memory is destaged in the storage device unit and data of the second memory or the third memory is not made to be dirty.

4. The storage system according to claim 1,
wherein the first controller is directly accessible to the second memory of the second controller and the third memory of the third controller.

5. The storage system according to claim 4,
wherein the transfer is performed by Direct Memory Access (DMA) of the first controller.

6. A data management method conducted by a storage system comprising:
a plurality of controllers;
a storage device unit into which data can be stored; and
wherein each of the controllers includes:
a processor unit; and
a memory,
wherein the method comprises the steps of:
storing new data according to a write request into a first memory of a first controller;
transferring, by the first controller, the new data from the first memory storing the new data corresponding to the write request to a second memory of a second controller; and
after completion of transfer to the second memory, transfers the data to a third memory of a third controller,
wherein in the case where a state of old data of the second memory and the third memory related to new data according to the write request is dirty, transfer is performed separately on the second memory and the third memory and the old data is overwritten, and
in the case where a state of old data of the second memory and the third memory is not dirty, transfer is performed in parallel on the second memory and the third memory and the old data is overwritten.

* * * * *